United States Patent [19]
Chang et al.

[11] Patent Number: 5,276,781
[45] Date of Patent: Jan. 4, 1994

[54] LASER PRINTER CONTROLLER FLEXIBLE FRAME BUFFER ARCHITECTURE WHICH ALLOWS HARDWARE ASSISTED MEMORY ERASE

[75] Inventors: Hershow Chang, Los Altos; Seong Kim, Saratoga; Tetsuro Motoyama, San Jose, all of Calif.

[73] Assignees: Ricoh Company, Ltd., Japan; Ricoh Corporation, San Jose, Calif.

[21] Appl. No.: 998,254

[22] Filed: Dec. 30, 1992

Related U.S. Application Data

[63] Continuation of Ser. No. 842,735, Feb. 27, 1992, abandoned, which is a continuation of Ser. No. 379,019, Jul. 12, 1989, abandoned.

[51] Int. Cl.$^5$ ............................................. G06F 15/00
[52] U.S. Cl. .................................... 375/116; 395/164
[58] Field of Search ............... 395/101, 115, 116, 139, 395/425, 164–166; 358/78, 404, 444; 340/750, 799–800

[56] References Cited

U.S. PATENT DOCUMENTS

| | | | |
|---|---|---|---|
| 3,914,747 | 10/1975 | Barnes et al. | 364/200 |
| 4,435,792 | 3/1984 | Bichtolsheim | 395/189.02 |
| 4,504,402 | 3/1985 | Gallaher et al. | 395/425 |
| 4,698,778 | 10/1987 | Ito et al. | 395/139 |
| 4,868,781 | 9/1989 | Kimura et al. | 395/164 |
| 5,029,105 | 7/1991 | Coleman et al. | 395/166 |
| 5,095,446 | 3/1992 | Jingu | 395/165 |

OTHER PUBLICATIONS

Dict of Computers by Rosenberg 1987.

*Primary Examiner*—Arthur G. Evans
*Attorney, Agent, or Firm*—Flehr, Hohbach, Test, Albritton & Herbert

[57] ABSTRACT

The present invention relates to a frame buffer used by a laser printer controller to send video signals to a laser printer engine. The frame buffer allows software to have sufficient control over the dimension of the buffer and to have sufficient time to process data by allowing hardware assisted memory erase.

19 Claims, 9 Drawing Sheets

LASER PRINTER CONTROLLER FLEXIBLE FRAME BUFFER ARCHITECTURE WHICH ALLOWS HARDWARE ASSISTED MEMORY ERASE

This is a continuation of application Ser. No. 07/842,735 filed Feb. 27, 1992, which is a continuation of application Ser. No. 07/379,019 filed Jul. 12, 1989, both now abandoned.

BACKGROUND OF THE INVENTION

The present invention is intended to be utilized with a printer controller for a laser printer engine which has, for example, 400 Dots Per Inch (DPI) with 20 pages per minute (ppm) speed. Because such an engine has higher speed and higher resolution, the printer controller requirements are more severe than 300 DPI and 8 ppm engines.

One of the key components to achieve higher speed and higher resolution is the control of a frame buffer used to buffer raster image information to be sent to the printer engine through a video interface.

In order to print through a laser printer, each pixel (picture element) must be defined as either black or white. A pixel is processed by the CPU (Central Processing Unit) of a controller and sent to the laser printer engine through video interface line(s). One major problem in this process of defining pixels of a page and sending the information to the printer engine is that the CPU is much slower in the processing time required to define the pixels than the printer engine needing them. One solution of this asynchronous process is to use a frame buffer for the synchronization.

There are two approaches in the prior art to construct a frame buffer. One approach is to create an entire page pixel definition by using a full bit map.

For example, if the printer engine is 300 DPI and handles only a letter size document, the buffer requires 2550×3300 pixels. The first number denotes the X dimension of the scanning (the number of pixels per scan line) and the second number denotes the number of scan lines (the Y dimension).

The other prior art approach is to receive an entire page description from a host computer and to create a display is list. Under this approach, the frame buffer can be smaller than the full bit nap depending upon the speed of creating the raster data from the display list. The frame buffer, which is smaller than full page bit map, is referred to as a band buffer.

When the frame buffer information is sent to the printer engine, the data in the memory of that location must be erased before other information can be written. If this erase is done by a CPU, the processing power of the CPU is taken up and less processing time is available to the CPU. The ideal solution is that the hardware reads out information from the buffer to be sent to the printer engine and at the same time writes the modified data to be blanked to the same location. However, none of the currently available Direct Memory Access (DMA) chips can memory-read-modify-write in one memory cycle.

SUMMARY AND OBJECTS OF THE INVENTION

It is an objective of the present invention to provide an improved laser printer control system.

According to one aspect of the present invention, the frame buffer memory should be optionally erased by the hardware option. In order to allow more processing time for the CPU, the memory erase is done by the hardware. This should be performed by a read-modify-write DMA cycle matching the data width described above. In addition, software should be able to enable this option. When this option is disabled, the memory content should not be modified.

Additional objects, advantages and novel features of the present invention will be set forth in part in the description which follows and in part become apparent to those skilled in the art upon examination of the following or may be learned by practice of the invention. The objects and advantages of the invention may be realized and attained by means of the instrumentalities and combinations which are pointed out in the appended claims.

BRIEF DESCRIPTION OF THE DRAWINGS

The accompanying drawings which are incorporated in and form a part of this specification illustrate an embodiment of the invention and, together with the description, serve to explain the principles of the invention.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
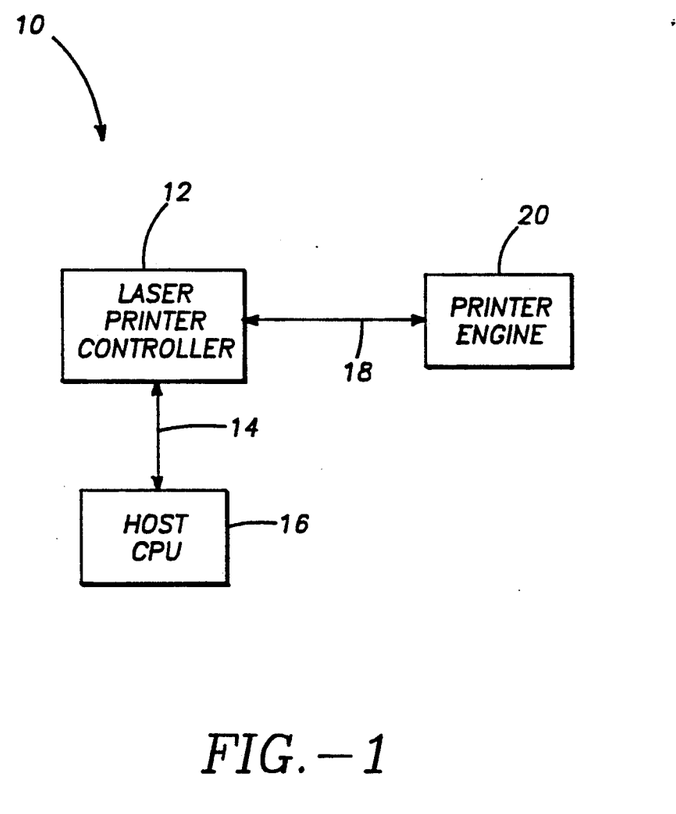
FIG. 1 depicts a block diagram of a control system for controlling a laser printer.

Referring now to FIG. 1, a block diagram of a control system 10 controlling a laser printer is depicted. In FIG. 1, a laser printer controller 12 is connected to a host CPU 16 via communication bus 14. Laser printer controller 12 is also connected to a laser printer engine 20 via a common communication bus 18.

The printer engine 20 could be any suitable type printer engine. In a preferred embodiment, printer engine 20 is one manufactured by Ricoh Corporation and Ricoh Company, Ltd., known as Imagio, which has 400 dots per inch (DPI) with 20 pages per minute (PPM) speed. Other types of printer engines, however, could be utilized with a laser printer controller according to the present invention.

Figure 2:
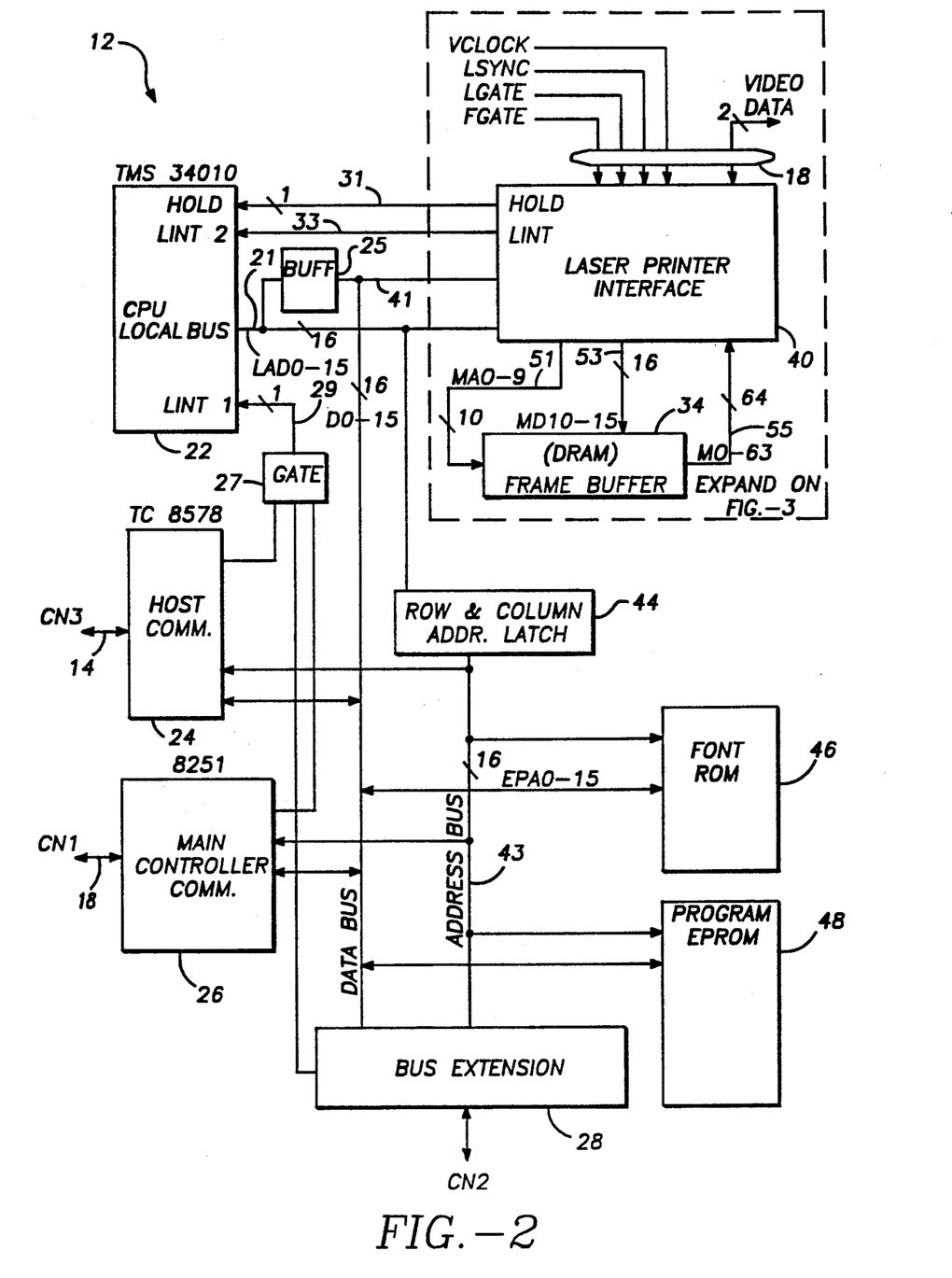
FIG. 2 depicts a block diagram of a laser printer controller system.

FIG. 2 shows an implementation of the laser printer controller according to the present invention. In FIG. 2, the laser printer controller 10 includes a CPU 22 (typically a TMS/34010 manufactured by Texas Instruments) for controlling the operation of the frame buffer.

The laser printer controller 12 of FIG. 2 also includes a host communication bus connection 24 to host CPU 16 of FIG. 1. Controller 12 includes a main controller communication bus connection 26 to the printer engine 20 of FIG. 1. Controller 12 includes a laser printer interface connection bus 18 to provide video data to printer engine 20 of FIG. 1. The laser printer interface bus 18 also includes the VCLOCK, LSYNC, LGATE and FGATE timing signals from printer engine 20 of FIG. 1.

The laser printer interface 40 of FIG. 2 is connected to the frame buffer 34 via bus 51 (MA0-9), bus 53 (NDI0-15), and bus 55 (MO-63).

The system 10 of FIG. 2 further includes a PONT ROM 46 and PROGRAM EPROM 48 and a bus extension circuit 28 to provide for future expansions such as additional memory and the like.

The system 10 of FIG. 2 also includes various data and address buses, such as data bus 23 (DO-15), address bus 43 (EPAO-15), and the like. Such buses are well known and need not be described in any great detail. The aspects of the present invention are shown in the dotted area defined by numeral 30. These aspects will now be described in conjunction with FIGS. 3-8.

Figure 3:
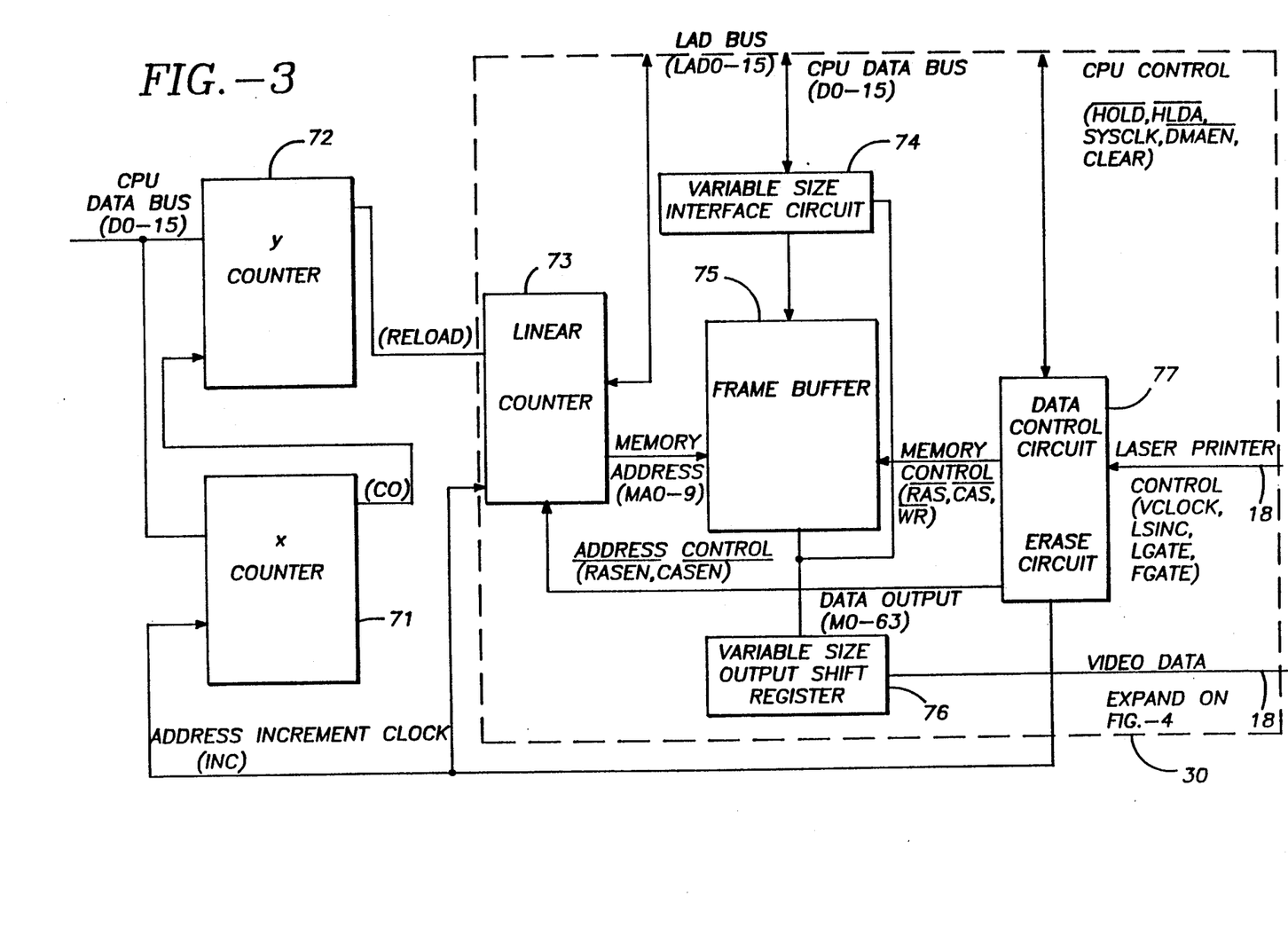
FIG. 3 depicts a variable frame buffer block diagram which forms a portion of FIG. 2.

FIG. 3 is the expansion of the defined area 30 in FIG. 2. The X counter 71 holds the number of dots per scan line. The Y counter 72 holds the number of scan lines. Both counters 71, 72 are 16-bit software programmable up counters. When the X counter 71 value reaches to the value set by the software, a one-shot pulse (CO) is sent to Y counter 72, incrementing its value. When the Y counter 72 value reaches to the value set by the software, the one-shot pulse is sent to linear counter 73, reloading the original starting address.

Those counters 71, 72, 73 are implemented by using Intel 82C54. An example of software flow chart to program counters 71, 72, 73 is listed in FIG. 8.

Linear counter 73 translates X and Y counters 71, 72 to the linear counter of the frame buffer address during DMA operation. Linear counter 73 is described as Latch and Mux 129 and DMA Address Linear Counter 130 in FIG. 4.

In FIG. 3, the variable size interface circuit 74 interfaces wider frame buffer data width (in one implementation 64 bits) to 16 bits CPU data bus, which is described as buffer 122, gate 123 and CAS generator 145 in FIG. 3. The DMA control circuit 77 transfers the wider data (64 bits) to the variable shift register 76, where the shift register 76 serially shifts the data out to the laser printer engine 20 via bus 18. DMA circuit 77 is described as 121, Dot Counter 121, latches 125-127 and dynamic random access memory timing generator 128 in FIG. 4. Register 76 is described as shift register with input latch 124 in FIG. 4.

Figure 4:
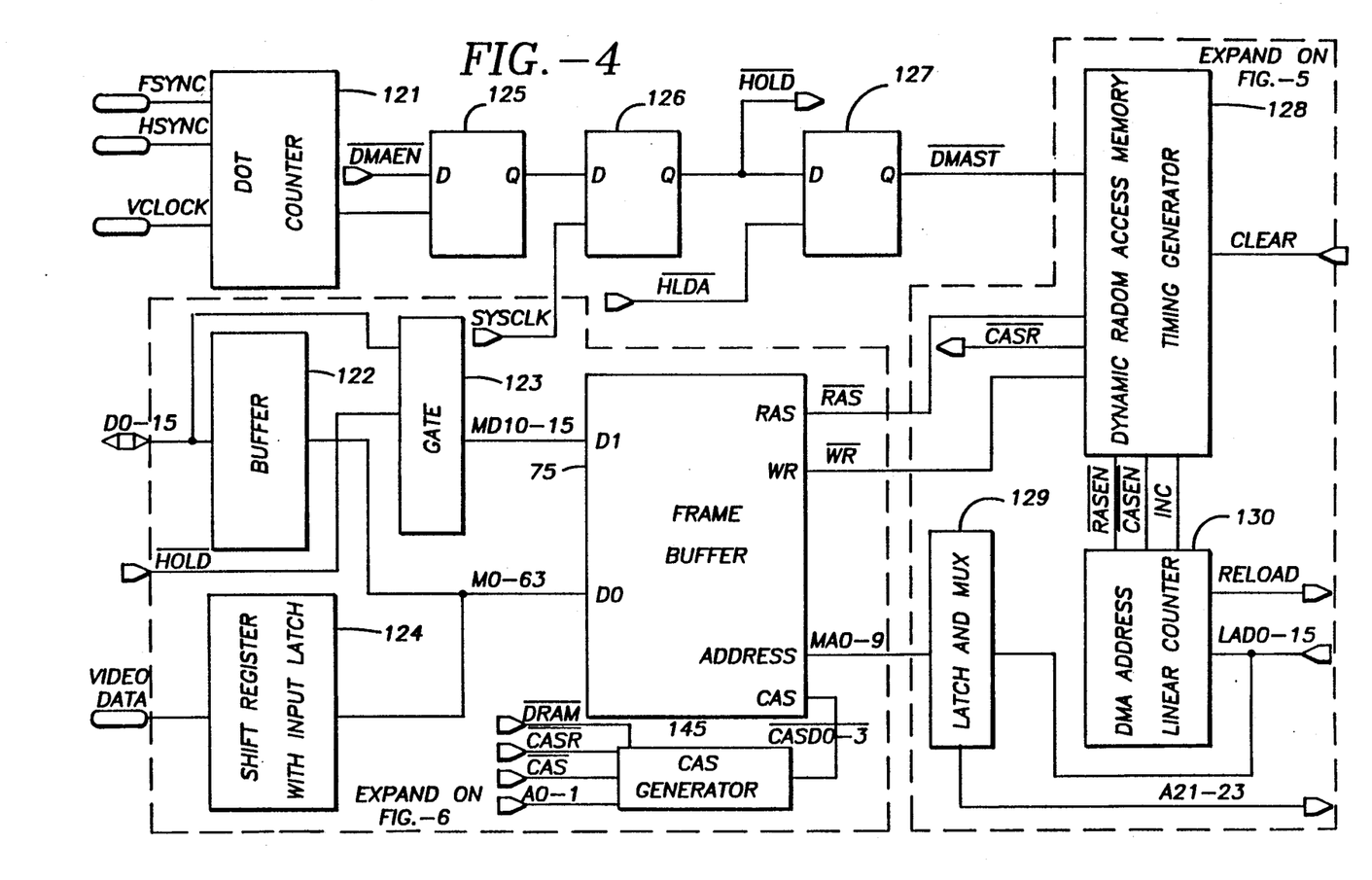
FIG. 4 depicts a DMA (Direct Memory Access) control block diagram which forms a portion of FIG. 3.

FIG. 4 shows the DMA controller block of FIG. 3. The dot counter 121 controlled by the Laser Printer Video signals generates DMA request whenever shift register 124 shifts out all data. The variable size interface circuit 74 in FIG. 3 consists of two parts. One is 64 bit buffer 122 which provides the interface for the CPU data bus of 16 bits to a wider frame buffer memory of 64 bits. The other part is the gate 123, which sets all 64 bits to zero input when the DMA cycle starts.

When the memory clear is enabled, the lowering of the WR-signal causes all the 64 bits input data to be zero. Therefore, the memory location is cleared during the same DMA cycle. This memory clearing function can be disabled so that the WR- signal stays in the high level during the DMA cycle and the memory data will not be changed.

Figure 6A:
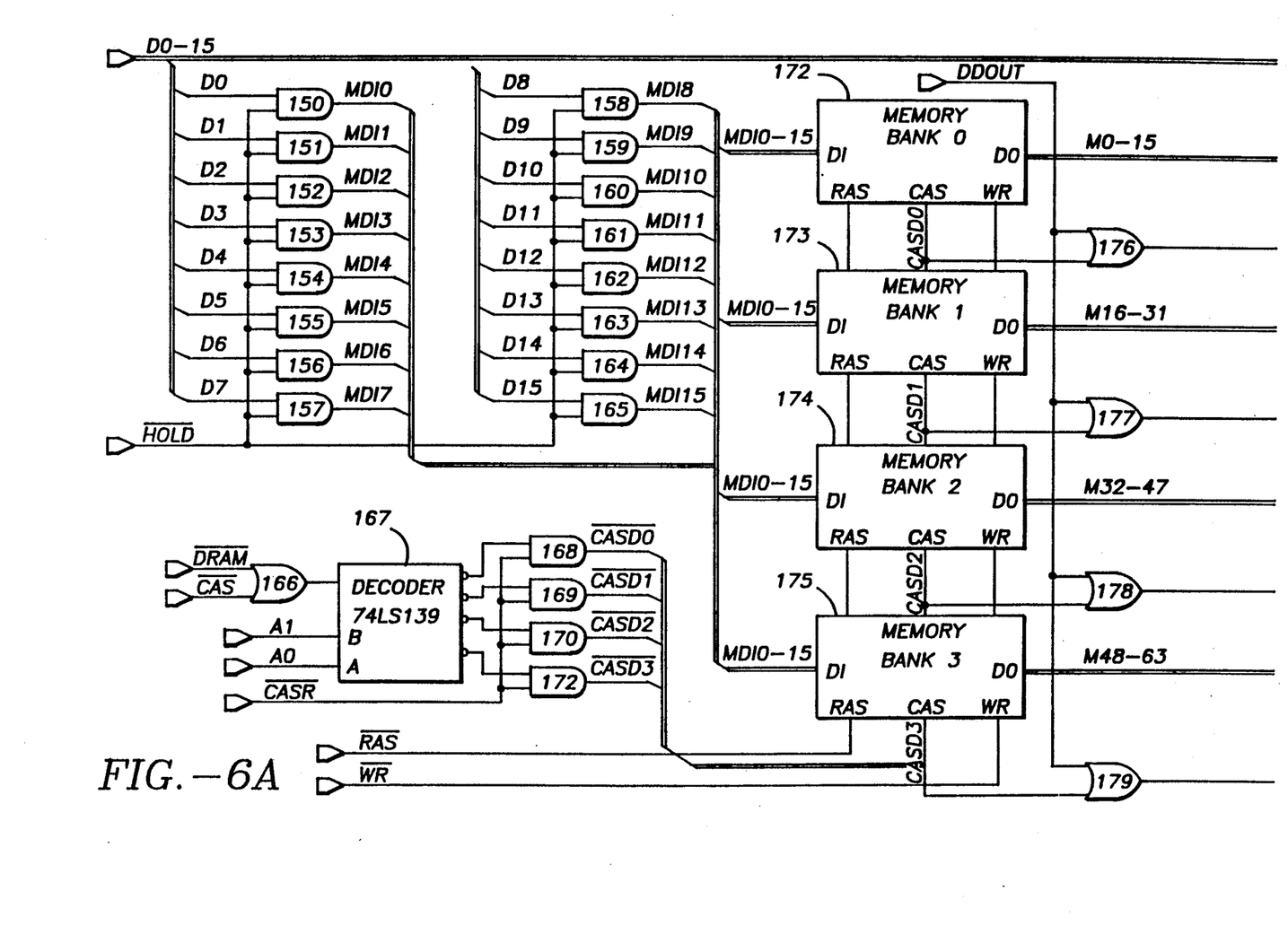
FIGS. 6A to 6B depicts a frame buffer and surrounding circuit diagram which forms a portion of FIG. 4.
Figure 6B:
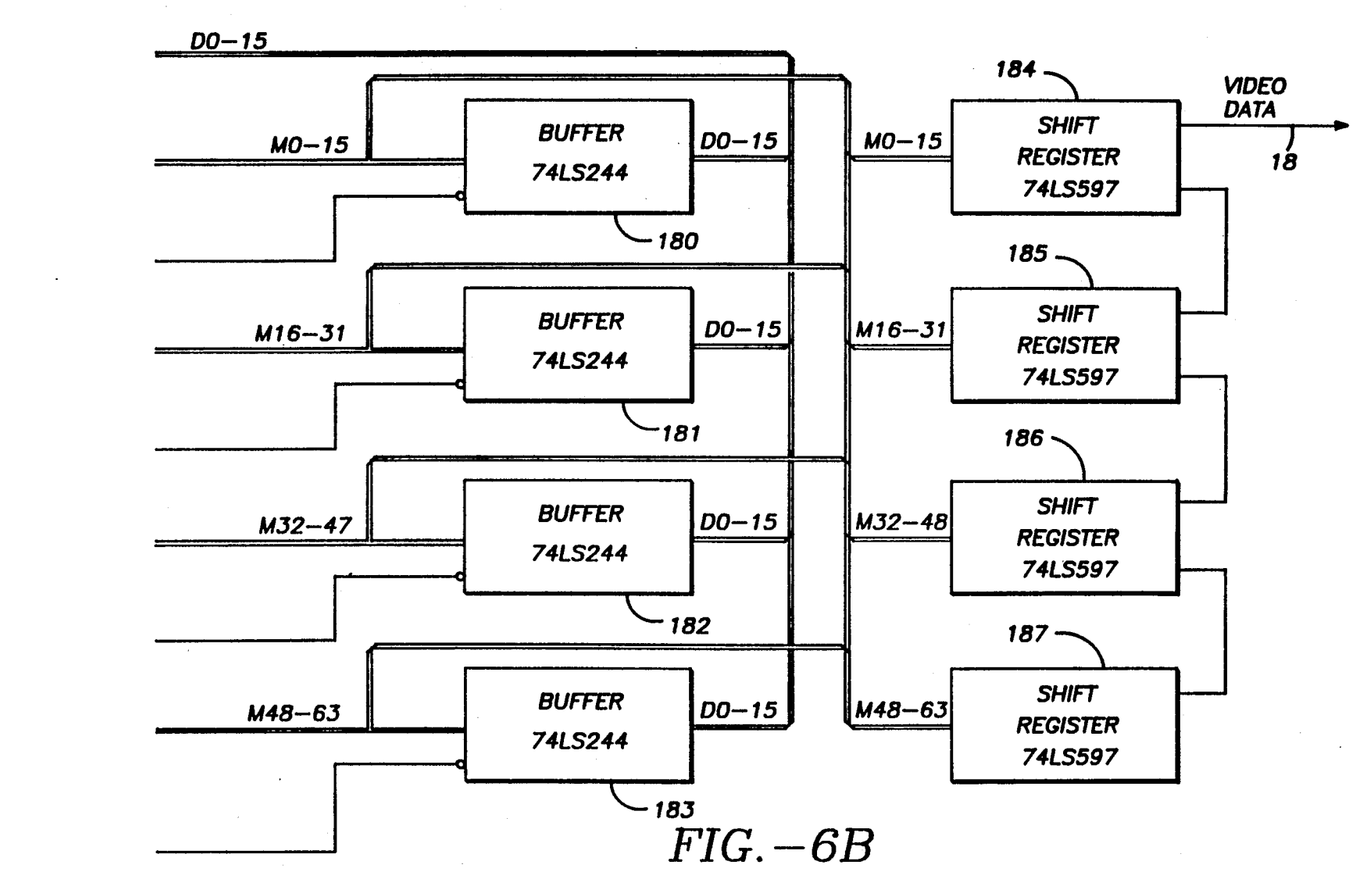

The CAS generator 145 of FIG. 4 generates four CASDO-3 signals which control four memory banks (as seen in FIG. 6) of 16 bits width. When the CPU reads or writes the frame buffer, only one CASD signal is selected, so that only 16 out of 64 bit bus are used. At the DMA cycle, all four CASD cycles are functional, resulting in an effective MO-63 bus. A more detailed mechanism is shown in FIG. 6.

In FIG. 4, Flip/Flops 125, 126 and 127 form a DMA synchronization circuit. They generate the DMAST- signal. The signal goes into the Dynamic Random Access Memory Timing Generator 128 to produce the RAS-, CASR- and WR-signals to control Dynamic RAM, and the RASEN-, CASEN- and INC signals to control DMA address counter 130. The DMA address linear counter 130 counts up by the INC signal and reloads by the RELOAD signal which comes from Y counter 72 in FIG. 3. The DMA address linear counter 130 provides the DRAM address during the DMA cycles. Timing generator 128 is described as data delay line 131, gate PAL 132, and buffers 133-136 in FIG. 5. Latch and mux 129 is described as Latch 140, Latch 141, and Mux 142 in FIG. 5. DMA address linear counter 130 is described as Counter 137, Counter 138 and Counter 139 in FIG. 5.

Figure 5:
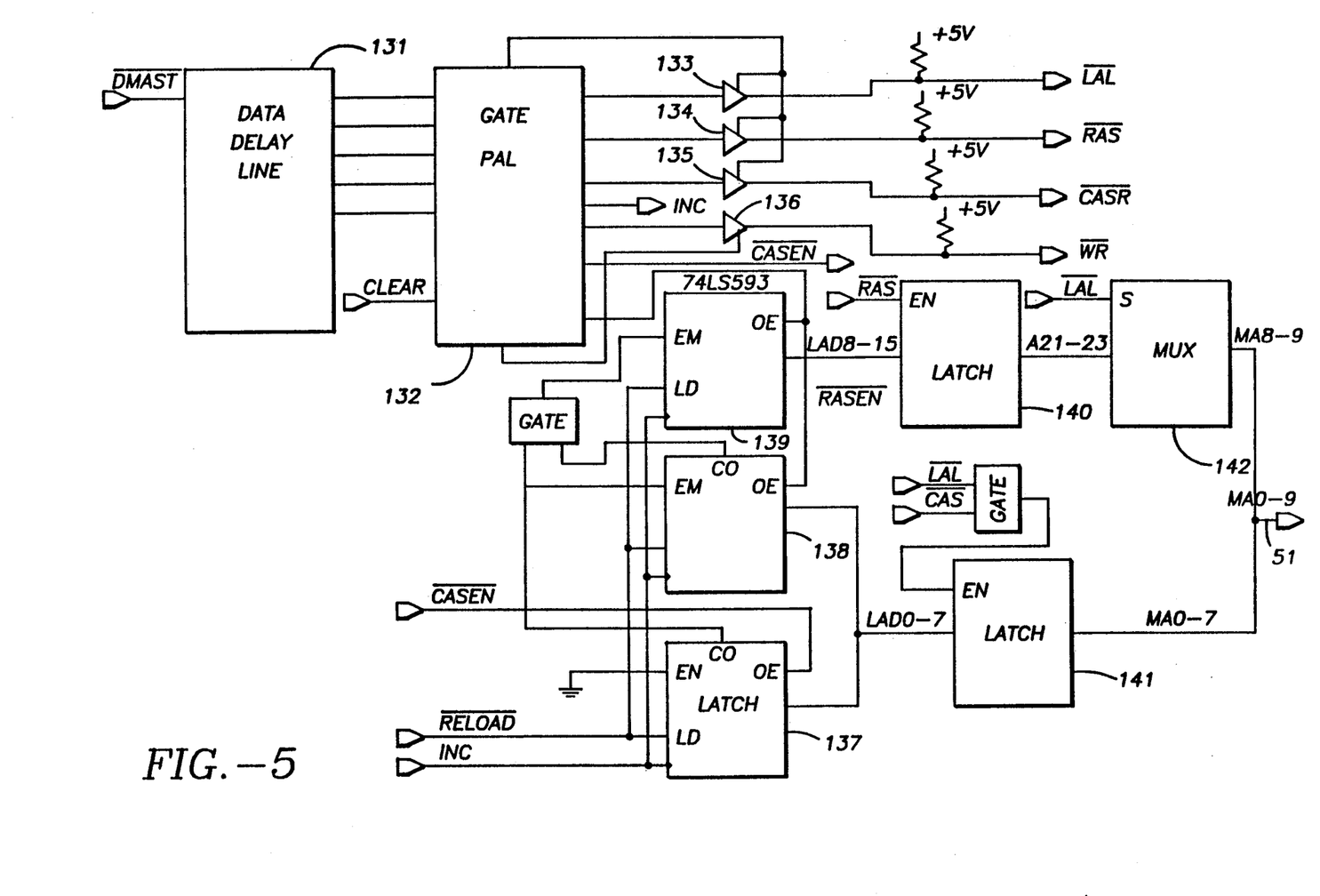
FIG. 5 depicts a timing and address generator circuit diagram which forms a portion of FIG. 4.

In FIG. 5, DMA Timing and Address Generator Circuit 128 is the expansion of DMA timing generator 128, Latch and Mux 129, and DMA address linear counter 130 of FIG. 4. The DMAST- signal goes into the data delay line 131 and gets a different timing interval. It then goes through a gating Program Array Logic (PAL) 132 to generate the necessary timing and control for the DMA control. The PAL 132 generates the RAS-, CASR-, WR- and LAL- signals which go through tristate buffers 133-136 and provide the DRAM control signals during DMA.

The counters #0 through #2 (137, 138; 139) are three ripple counters. They count up with INC signal which comes from PAL 132. The counters 137, 138, 139 reload the programmed start values when Y counter 72 reaches to its maximum value. The counters 138, 139 contain higher memory address which comes out during RAS time. The counter 138 address goes through latch 141 to provide DRAM row address MAO-7 at RAS time. The counter 139 address is stored in latch 140. The latched address provides two DMA address bits (MA8-9) at both RAS and CAS time through Mux 142. The counter 137 is a low address counter. It provides the 8 bits DMA memory address at CAS time.

Gate 123 of FIG. 4 consists of 16 AND GATES 150-165 as shown in FIG. 6. At normal CPU cycle, the HOLD- signal stays high. The CPU data (DO-15) passing through these gates become input data MDIO-15 to the frame buffer with the same logical state. At the DMA cycle, the HOLD- signal becomes low, which forces all MDIO-15 data to low level. When the clear memory function is enabled, the write operation follows the read operation. All the 64 bits input to the frame buffer of four memory banks 172-175 will be cleared through 16 bits of MDIO-15 input.

The frame buffer 75 of FIG. 3 is made up of four memory banks 172-175, as shown in FIG. 6. Input of each bank has 16 bits data path (MDIO-15) which is the same width as the CPU data bus (DO-15). The number of banks can be varied from 1, 2, 4, 8, and so on, to match the speed of laser printer engine 20.

Figure 7:
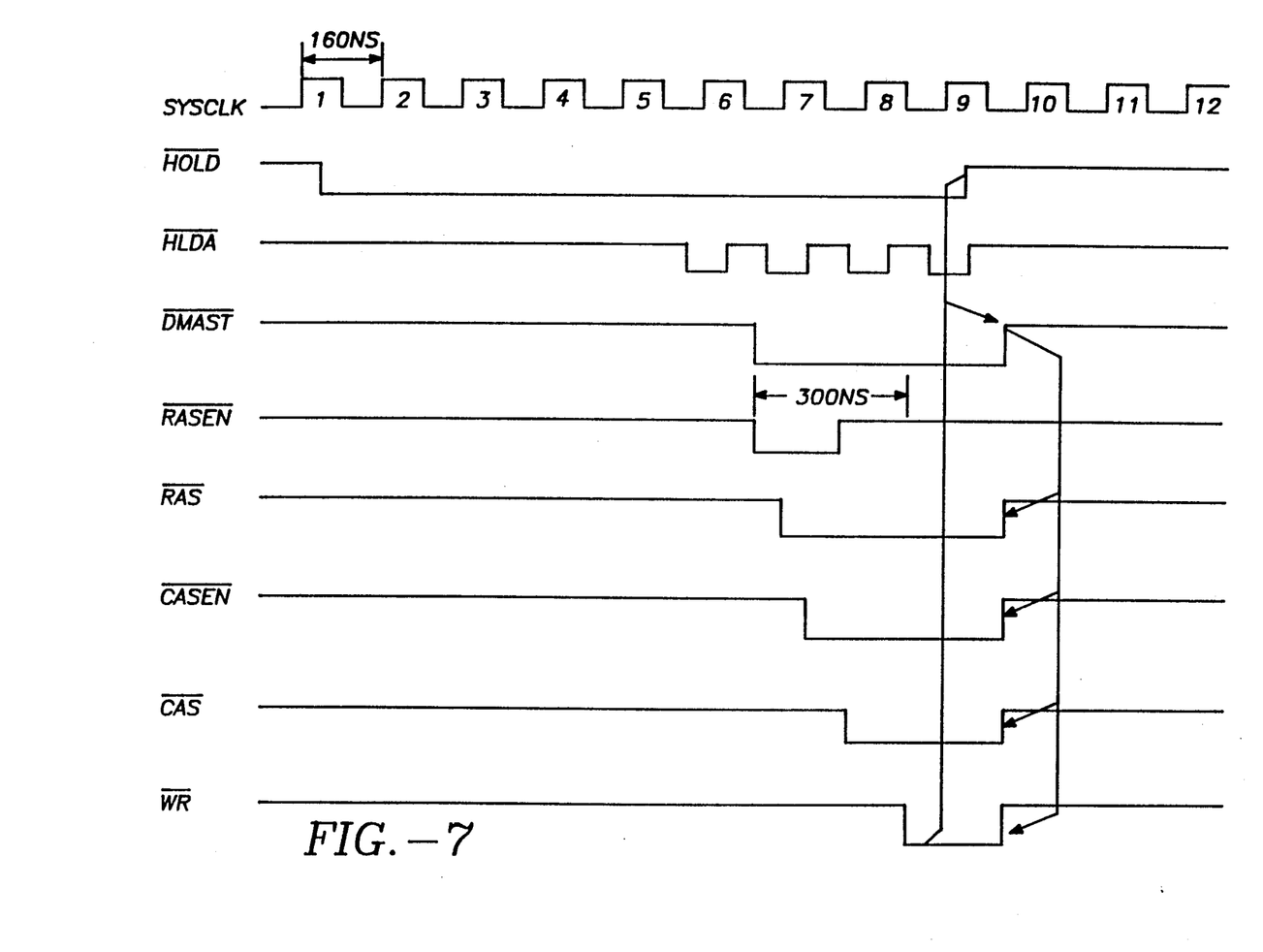
FIG. 7 depicts a DMA timing diagram.

Four banks were selected for one preferred implementation, resulting in 64-bit output data path (MO-63). Each memory bank 172-175 of FIG. 6 has the same RAS-, WR- signal lines and 16-bit input data lines of NDIO-15, but has different output data lines (16 of MO-63) and CAS signal line (one of CASDO-3). The timing of the DMA operation is shown in FIG. 7.

Since the CAS signal is an important signal for read or write operation of memory bank, the CAS signal can be controlled in order to control the variable frame buffer operation.

The CAS generator 145 of FIG. 4 consists of an OR GATE 166, a decoder 167 and four AND GATEs 168-171, as shown in FIG. 6. Signal DRAM- comes from CPU address decoder 167. CAS-, A0 and A1 are from CPU. These signals go into the CAS generator 145. Gate 166 and decoder 167 select one out of four CASDO-3 signals at the normal CPU operation cycle. When the DMA operation CASR- signal from timing generator 128 of FIG. 4 goes active (low), all four CASDO-3 become active at the same time, allowing operation on all the four memory banks 172-175 at the same time.

The buffer 122 of FIG. 4 consists of four OR GATEs 176-179 and buffers 180-183, which selects one set of the memory bank output data (MO-63) to the CPU data bus (DO-15) at the normal CPU operation cycle. During DMA cycle, the DDOUT signal which cones from CPU stays high and all of the buffers 180-183 are in the tristate stage blocking the data to CPU bus.

The shift register with input latch 124 of FIG. 4 consists of four blocks of shift registers 184-187, as also seen in FIG. 6. Those shift registers 184-187 latch 64 bits memory bank data (M0-63) during the DMA cycle and serially shift out to the laser printer 20.

FIG. 7 shows the design timing chart for the DMA circuit, including the SYSCLK, HOLD-, HLDA-, DMAST-, RASEN-, RAS-, CASEN-, CAS-, and WR- timing signals.

Figure 8:
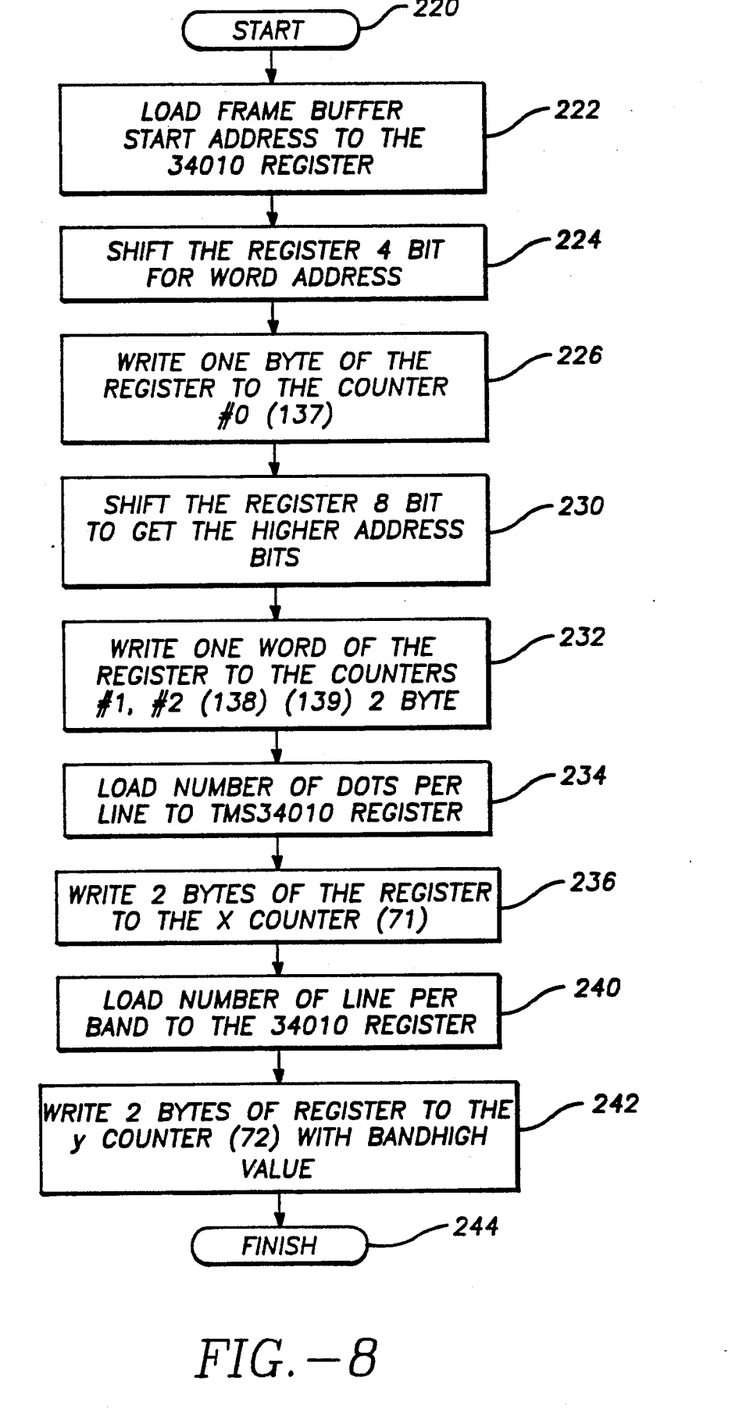
FIG. 8 depicts a software flow chart for initialization of the X, Y and linear counters which form a portion of FIG. 3.

FIG. 8 shows the software flow chart example to set the starting address, X counter and Y counter. Referring now to FIG. 8, a software flow chart for initialization of the X, Y and linear counters 72, 71 and 73 of FIG. 3 is shown. In FIG. 8, after start step 220, the flow chart starts with step 222 of loading the frame buffer start address to the register of CPU 22 of FIG. 2.

The next step 224 is to shift the register four bits for word address.

The next step 226 writes one byte of the register to the counter 137 of FIG. 5.

At step 230, the flow chart of FIG. 8 shifts the register 8 bits to get the higher address bits.

The next step 232 writes one word of the register to counters 138, 139 of FIG. 5.

The next step 234 in FIG. 8 loads the number of dots per line to the register of CPU 22 of FIG. 2.

The next step 236 in FIG. 8 writes two bytes of the register to the X counter 71 of FIG. 3.

The next step 240 loads the number of line per band to the register of CPU 22 of FIG. 2.

The next step 242 of FIG. 8 writes two bytes of the register to the Y counter 72 of FIG. 3 with a bandhigh value.

The foregoing description of the preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and its various embodiments and with various modifications as are suited to the particular use contemplated. It is intended that the scope of the invention be defined only by the claims appended hereto.

What is claimed is:

1. A controller system for controlling a display device, said controller system being coupled to a processor for processing data to be displayed on said display device, said controller system comprising:

frame buffer memory means for storing data received from said processor, and for providing said data to said display device, wherein said frame buffer memory means includes a plurality of memory cells, and control means for controlling transmission of said data from said plurality of memory cells in said frame buffer memory means to said display device in a direct memory access (DMA) mode, wherein said DMA operates in clock cycles, said control means including:
   a) means for setting a DMA data reading cycle,
   b) a DMA circuit for reading data stored in a sequence of memory cells during said DMA data reading cycle, and
   c) a memory erasing circuit for writing a predefined data value into said sequence of memory cells while said data stored in said sequence of memory cells are being read out during said DMA data reading cycle, thereby allowing said sequence of memory cells to be erased during said DMA data reading cycle without provision of externally generated data.

2. A system as in claim 1 including
   a data bus for providing said data from said processor to said frame buffer memory means,
   wherein said frame buffer memory means includes one or more memory banks with each of said memory banks having a data width equal to that of said data bus,
   wherein said DMA circuit reads, and writes said predefined value within, said memory banks during said DMA data reading cycle.

3. A system as in claim 2 wherein said control means include means for interfacing outputs of said data from said memory banks, said interfacing means having a data width equal to total data widths of said memory banks, wherein said data stored in said memory banks are simultaneously transmitted to said interfacing means within said DMA data reading cycle during which said memory banks are being read out.

4. A system as in claim 3 wherein said interfacing means includes a shift register and wherein said control means include means for controlling transfer of said data from said frame buffer memory means to said shift register.

5. A system as in claim 2 wherein number of memory banks corresponds to match printer engine speed.

6. A system as in claim 5 wherein said control means includes means for simultaneously activating all of said memory banks.

7. A system as in claim 1 wherein said memory erasing circuit clears said plurality of memory cells in said frame buffer memory means to zero during said DMA data reading cycle.

8. A system as in claim 7 wherein said memory erase circuit can be disabled.

9. A system as in claim 8 wherein said control means includes a timing generating means for generating a plurality of timing control signals, and means for addressing said frame buffer memory means during said DMA data reading cycle.

10. A controller system for controlling a display device, said controller system being coupled to a processor for processing data to be displayed on said display device, the system comprising
 a first data bus for providing said data in response to a processor mode,
 frame buffer memory means for storing data received via said first data bus in said processor mode, wherein said frame buffer memory means includes a plurality of memory banks with each of said memory banks including a plurality of memory cells, wherein said first data bus has a data width equal to that of each of said memory banks, and wherein said plurality of memory banks are consecutively activated in said processor mode,
 a second data bus for providing said data stored in said frame buffer memory means to said display device in response to a direct memory access (DMA) mode, wherein said second data bus has a data width equal to total data widths of said memory banks,
 control means for controlling transmission of said data stored in said frame buffer memory means to said display device via said second data bus in said direct memory access (DMA) mode, wherein said DMA mode operates in clock cycles, said control means including:
 a) means for setting a DMA data reading cycle which includes a plurality of memory cycles, wherein each memory cycle includes a memory reading cycle and a memory writing cycle,
 b) means for simultaneously activating said plurality of memory banks during said DMA data reading cycle,
 c) means for simultaneously reading out said plurality of memory banks within said memory reading cycle during said DMA data reading cycle,
 d) means for simultaneously writing a predefined data value into said plurality of memory banks within said memory writing cycle during said DMA data reading cycle, thereby allowing said plurality of memory banks to be erased during said DMA data reading cycle without being provided with externally generated data.

11. A system as in claim 1, wherein said control means further comprises
 means for indicating a starting address of said frame buffer memory means, and
 means for indicating an ending address of said frame buffer memory means,
 wherein said DMA circuit accesses individual memory cells within said starting address and ending address during said DMA data reading cycle.

12. A system as in claim 1 further comprising
 a first data bus for providing said data to said frame buffer memory means,
 a second data bus for providing said data stored in said frame buffer memory means to said display device,
 wherein said frame buffer memory means has a plurality of memory banks,
 wherein said first data bus has a data width equal to that of each of said memory banks, and
 wherein said second data bus has a data width equal to total data widths of said memory banks.

13. A system as in claim 12
 wherein said system operates under a processor mode when said frame buffer memory receives said data from said processor via said first data bus, and
 wherein said system operates under said DMA mode when said control means transfers said data from said frame buffer memory to said printer engine via said second data bus.

14. A system as in claim 13, wherein each of said memory banks further comprises
 an input terminal, having a data width equal to that of said first data bus, for receiving said data from said first data bus,
 a fist dimension selecting terminal and a second dimension selecting terminal for selecting individual memory cells in said memory banks, and
 a writing activating terminal for writing said individual memory cells selected by said first and second dimension selecting terminals.

15. A system as in claim 14 further comprising
 connecting means for connecting said first data bus to said input terminals of each of said memory banks, wherein said connecting means having a data width equal to those of said first data bus and said input terminals of each of said memory banks, and wherein input of said connecting means is coupled to said first data bus and output of said connecting means is coupled to said input terminals of each of said memory banks,
 connecting control means for connecting said first data bus to said input terminals of each of said plurality of memory banks in response to said processor mode, for disconnecting said first data bus from said input terminals of each of said memory banks in response to said DMA mode, and
 activating control means for sequentially activating said second dimension selecting terminals of each of said plurality of memory banks in response to said processor mode, and for simultaneously activating said second dimension selecting terminals of each of said plurality of memory banks in response to said DMA mode.

16. A system in claim 15 wherein said connecting control means sets an output of said connecting means in a predetermined logic state.

17. A system in claim 16 wherein said predetermined logic state represents a "low" logic state.

18. A system as in claim 15 wherein said writing activity terminal receives a writing activating signal to write said individual memory cells selected by said first dimension selecting means and said second dimension selecting means in responsive to said output of said connecting means, and wherein the writing activating signal appears in each of said memory cycles.

19. A system as claim 1, wherein said erase circuit erases said plurality of memory cells during said DMA data reading cycle without being provided with externally generated addresses.

* * * * *